United States Patent
Miura et al.

(10) Patent No.: US 9,146,131 B2
(45) Date of Patent: Sep. 29, 2015

(54) EVALUATION INDICATION SYSTEM, EVALUATION INDICATION METHOD AND COMPUTER-READABLE STORAGE MEDIUM

(75) Inventors: Naoki Miura, Toyokawa (JP); Junichi Nonomura, Okazaki (JP); Junki Yamakawa, Okazaki (JP); Hiroyuki Mizuno, Kariya (JP)

(73) Assignee: AISIN AW CO., LTD., Anjo (JP)

( * ) Notice: Subject to any disclaimer, the term of this patent is extended or adjusted under 35 U.S.C. 154(b) by 297 days.

(21) Appl. No.: 13/523,276

(22) Filed: Jun. 14, 2012

(65) Prior Publication Data

US 2013/0018538 A1  Jan. 17, 2013

(30) Foreign Application Priority Data

| Jul. 5, 2011 | (JP) | 2011-148878 |
| Aug. 5, 2011 | (JP) | 2011-171681 |
| Aug. 5, 2011 | (JP) | 2011-171682 |
| Sep. 28, 2011 | (JP) | 2011-213307 |
| Nov. 2, 2011 | (JP) | 2011-241506 |

(51) Int. Cl.
*G06F 19/00* (2011.01)
*G06G 7/70* (2006.01)
(Continued)

(52) U.S. Cl.
CPC ........ *G01C 21/3697* (2013.01); *B60R 16/0236* (2013.01); *G01C 21/3469* (2013.01); *G01C 21/3617* (2013.01)

(58) Field of Classification Search
CPC ............... G01C 21/32; G01C 21/3676; G01C 21/3492; G01C 21/3617; Y02T 10/6217; Y02T 10/6291; Y02T 90/32; Y02T 10/7077; Y02T 10/7044
See application file for complete search history.

(56) References Cited

U.S. PATENT DOCUMENTS

| 6,314,363 B1 | 11/2001 | Pilley et al. |
| 8,655,527 B2 * | 2/2014 | Harumoto et al. .............. 701/22 |

(Continued)

FOREIGN PATENT DOCUMENTS

| DE | 10 2006 054 326 A1 | 5/2008 |
| DE | 10 2007 007 955 A1 | 8/2008 |

(Continued)

OTHER PUBLICATIONS

Oct. 29, 2013 Office Action issued in U.S. Appl. No. 13/530,917.
(Continued)

*Primary Examiner* — Helal A Algahaim
*Assistant Examiner* — Paul Castro
(74) *Attorney, Agent, or Firm* — Oliff PLC

(57) ABSTRACT

Evaluation indication systems, methods, and programs are provided for a hybrid vehicle that is configured to travel in an HV mode with an internal combustion engine or in an EV mode without the internal combustion engine. The systems, methods, and programs display a current position of the hybrid vehicle on a map, acquire current evaluations of fuel consumption of the hybrid vehicle in current travel by unit sections, acquire previous evaluations of fuel consumption of the hybrid vehicle in previous travel by unit sections, and indicate current evaluation icons on the map, each of the icons being an EV icon or an HV icon. Each EV icon indicates that the hybrid vehicle has travelled within the corresponding unit section in the EV mode and each HV icon indicates that the hybrid vehicle has travelled within the corresponding unit section in the HV mode.

6 Claims, 7 Drawing Sheets

(51) Int. Cl.
*G01C 21/36* (2006.01)
*B60R 16/023* (2006.01)
*G01C 21/34* (2006.01)

(56) References Cited

U.S. PATENT DOCUMENTS

| | | |
|---|---|---|
| 2002/0056314 A1 | 5/2002 | Kumagai et al. |
| 2003/0006914 A1* | 1/2003 | Todoriki et al. .............. 340/995 |
| 2006/0271284 A1 | 11/2006 | Watanabe et al. |
| 2007/0005237 A1 | 1/2007 | Needham et al. |
| 2007/0078599 A1 | 4/2007 | Yoshioka et al. |
| 2008/0294339 A1* | 11/2008 | Tauchi et al. .............. 701/212 |
| 2010/0058225 A1 | 3/2010 | Lin et al. |
| 2010/0185384 A1* | 7/2010 | Naito et al. ................. 701/200 |
| 2011/0288737 A1 | 11/2011 | Carr |
| 2012/0004838 A1 | 1/2012 | Lee et al. |
| 2012/0022904 A1 | 1/2012 | Mason et al. |
| 2012/0029803 A1 | 2/2012 | Yasushi et al. |
| 2012/0191334 A1* | 7/2012 | Kashio et al. .............. 701/123 |
| 2012/0265433 A1* | 10/2012 | Viola et al. ................. 701/410 |
| 2013/0179062 A1* | 7/2013 | Yasushi et al. .............. 701/123 |
| 2013/0245945 A1* | 9/2013 | Morita et al. ................. 701/533 |

FOREIGN PATENT DOCUMENTS

| | | |
|---|---|---|
| DE | 10 2008 041 255 A1 | 2/2010 |
| EP | 1 973 078 A1 | 9/2008 |
| EP | 2 295 934 A1 | 3/2011 |
| JP | H09184732 A | 7/1997 |
| JP | H10-227648 A | 8/1998 |
| JP | A-2002-350152 | 12/2002 |
| JP | 2003288003 A | 10/2003 |
| JP | A-2004-251786 | 9/2004 |
| JP | 2004286496 A | 10/2004 |
| JP | 2006-030058 A | 2/2006 |
| JP | 2007187681 A | 7/2007 |
| JP | 2008180576 A | 8/2008 |
| JP | 2009-002847 A | 1/2009 |
| JP | 2010-151570 A | 7/2010 |
| JP | A-2010-182108 | 8/2010 |
| JP | A-2011-033447 | 2/2011 |
| WO | 2011/030397 A1 | 3/2011 |
| WO | WO 2011/030398 | 3/2011 |

OTHER PUBLICATIONS

European Search Report issued in European Patent Application No. EP 12 17 3213.5 dated Jun. 23, 2014.

European Search Report issued in European Patent Application No. EP 12 17 3221.8 dated Jun. 18, 2014.

European Search Report issued in European Patent Application No. EP 12 17 3234.1 dated Jun. 23, 2014.

* cited by examiner

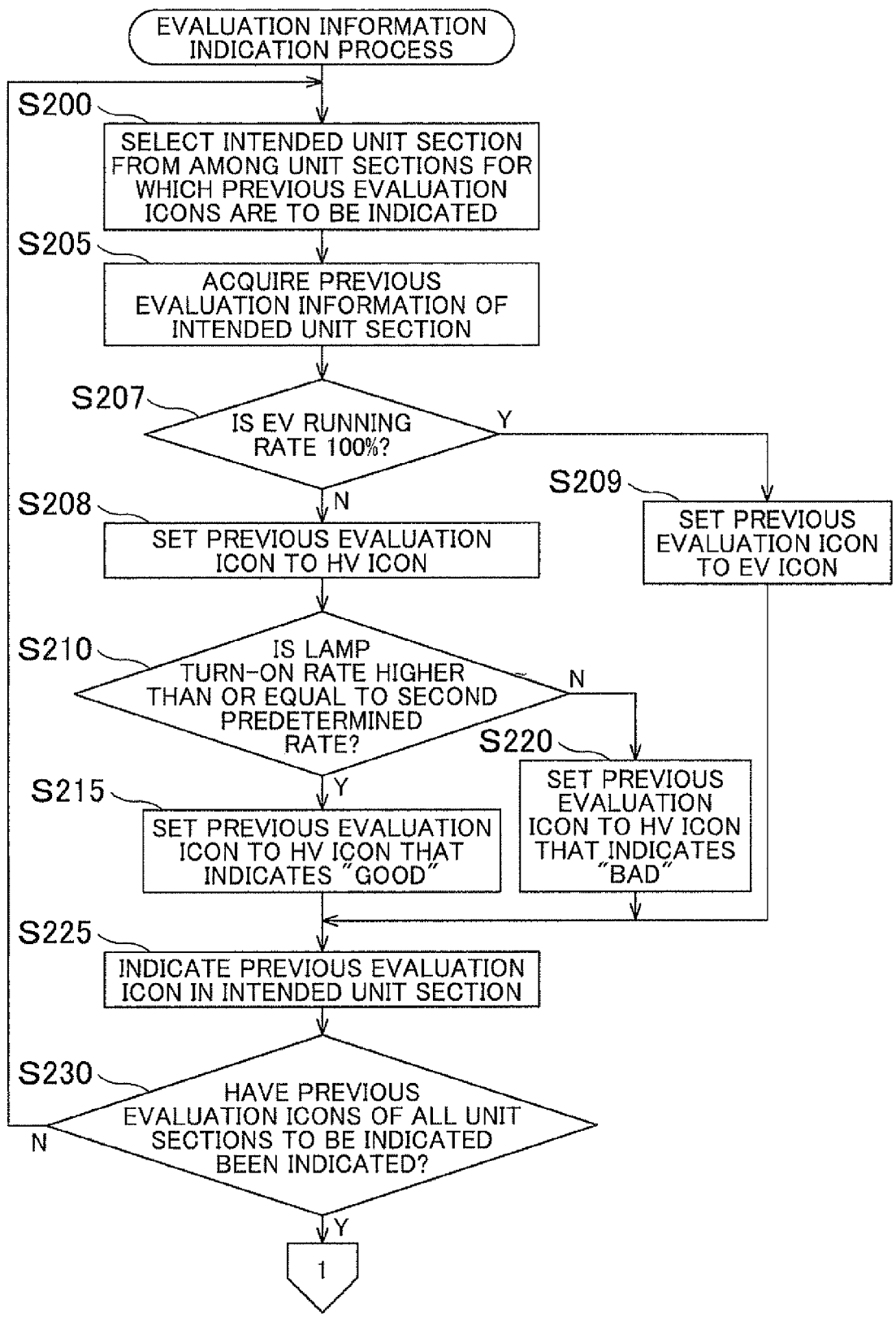

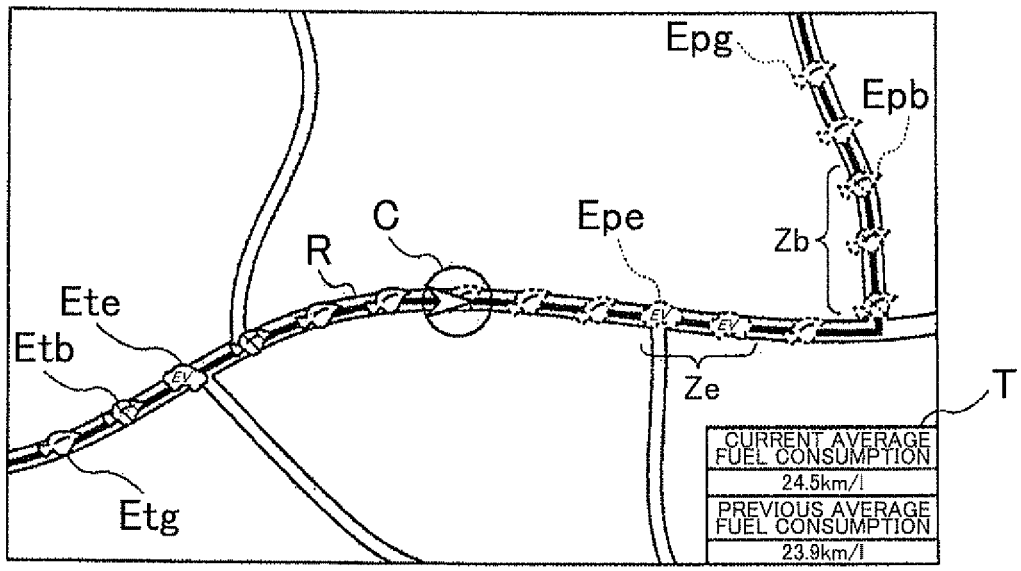
F I G . 5A
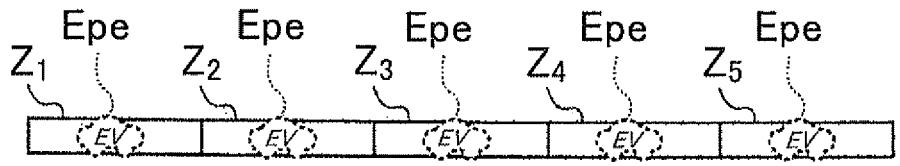
F I G . 5B
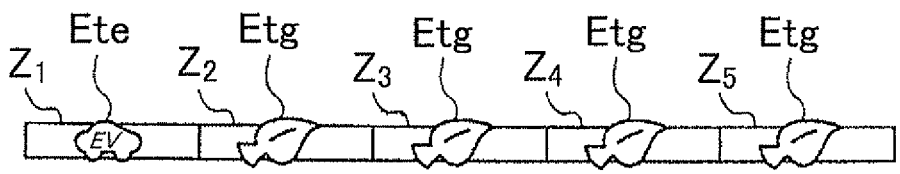
F I G . 5C
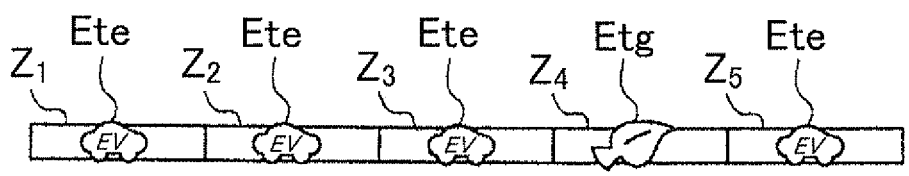
F I G . 5D

EVALUATION INDICATION SYSTEM, EVALUATION INDICATION METHOD AND COMPUTER-READABLE STORAGE MEDIUM

INCORPORATION BY REFERENCE

The disclosure of Japanese Patent Applications No. 2011-241506 filed on Nov. 2, 2011, No. 2011-148878 filed on Jul. 5, 2011, No 2011-171681 filed on Aug. 5, 2011, No. 2011-171682 filed on Aug. 5, 2011, and No. 2011-213307 filed on Sep. 28, 2011 including the specification, drawings and abstract is incorporated herein by reference in its entirety.

BACKGROUND OF THE INVENTION

1. Field of the Invention

The invention relates to an evaluation indication system, evaluation indication method and computer-readable storage medium that indicate an evaluation of fuel consumption of a vehicle.

2. Description of the Related Art

In related arts, various techniques for indication for improving the fuel consumption of a vehicle have been developed. For example, Japanese Patent Application Publication No. 2011-33447 (JP 2011-33447 A) describes a technique for indicating that the energy consumption of a host vehicle exceeds a reference value in association with locations in a current travel route. In addition, Japanese Patent Application Publication No. 2004-251786 (JP 2004-251786 A) describes a technique for indicating information that allows comparison in each section between a current fuel consumption and a historical average fuel consumption. Furthermore, Japanese Patent Application Publication No. 2002-350152 (JP 2002-350152 A) describes a technique for indicating an evaluation (good, intermediate, bad, or the like) of fuel consumption in previous travel on a map for each point or each route together with an evaluation of current fuel consumption at a current position of the vehicle.

SUMMARY OF THE INVENTION

In the above described related arts, it has been difficult to make a significant comparison on the basis of an evaluation of fuel consumption in current travel and an evaluation of fuel consumption in previous travel. Particularly, it has been difficult to obtain information for achieving a high travel efficiency in a hybrid vehicle. That is, in the techniques described in JP 2011-33447 A and JP 2004-251786 A, a fuel consumption in current travel is compared with a reference value or a historical average value, and a fuel consumption in current travel is evaluated in these techniques; however an evaluation of fuel consumption in previous travel is not indicated. Thus, a driver of a vehicle is not allowed to contrast an evaluation of fuel consumption in previous travel with an evaluation of fuel consumption in current travel while driving, so it cannot be determined whether there is room for suppressing consumption of fuel in current travel by improving the way of driving from a current position.

In addition, in the technique described in JP 2002-350152 A, an evaluation of fuel consumption in previous travel is indicated for each location; however, an evaluation of fuel consumption in current travel indicates only an instantaneous value at a current position. It is actually impossible for the driver to continuously pay attention to an instantaneous value while driving in order to suppress consumption of fuel, so it cannot be determined whether a current fuel consumption has been continuously in good condition. Thus, in JP 2002-350152 A as well, an evaluation of fuel consumption in previous travel cannot be contrasted with an evaluation of fuel consumption in current travel while driving, so it is actually impossible to determine whether there is room for improvement in the way of driving from a current position in consideration of consumption of fuel in current travel before the current position. Thus, in the related art, it has been difficult to suppress consumption of fuel by improving the way of driving during current travel.

Furthermore, in the above described related arts, the operating state of a hybrid vehicle is not indicated. The hybrid vehicle is able to travel in an HV mode in which an internal combustion engine is allowed to be driven and in an EV mode in which the internal combustion engine is stopped and a motor is used to travel. Recently, the cost of recharging electric power for travelling a unit distance is lower than the cost of refueling liquid fuel for travelling the unit distance, so the travel efficiency of a vehicle for travelling the unit distance is higher in the EV mode rather than in the HV mode. In addition, in a general hybrid vehicle, as the driving technique improves, a fuel consumption in the HV mode gradually improves even in the same travel section, and, as the driving technique further improves, the hybrid vehicle is able to travel not in the HV mode but in the EV mode. On the other hand, in order for the hybrid vehicle to travel in the EV mode, the battery of the vehicle needs to achieve a sufficient state of charge (SOC) for the EV mode. The indication as in the case of the related arts cannot help the driver of a hybrid vehicle to improve the driving technique in consideration of such a situation.

The invention provides an evaluation indication system, evaluation indication method and computer-readable storage medium that guide information for helping a driver of a hybrid vehicle to improve driver's own driving technique.

A first aspect of the invention provides an evaluation indication system for a hybrid vehicle that includes an internal combustion engine and a motor and that is configured to travel in an HV mode in which the internal combustion engine is allowed to be driven or in an EV mode in which the internal combustion engine is stopped. The evaluation indication system includes: a map display control unit that displays a current position of the hybrid vehicle and a map around the current position on a display unit; a current evaluation acquisition unit that acquires current evaluations that indicate evaluations of fuel consumption of the hybrid vehicle in current travel by unit sections; and a previous evaluation acquisition unit that acquires previous evaluations that indicate evaluations of fuel consumption of the hybrid vehicle in previous travel prior to the current travel by unit sections, wherein: the map display control unit indicates current evaluation icons that indicate the current evaluations and previous evaluation icons that indicate the previous evaluations together by unit sections on the map, and sets each of the current evaluation icons and the previous evaluation icons to any one of an EV icon and an HV icon; the EV icon indicates that the hybrid vehicle has travelled an evaluation section within the corresponding unit section in the EV mode; and the HV icon indicates an evaluation of fuel consumption when the hybrid vehicle has travelled the evaluation section within the corresponding unit section in the HV mode.

A second aspect of the invention provides an evaluation indication method for a hybrid vehicle that includes an internal combustion engine and a motor and that is configured to travel in an HV mode in which the internal combustion engine is allowed to be driven and an EV mode in which the internal combustion engine is stopped. The evaluation indication method includes: displaying a current position of the hybrid vehicle and a map around the current position on a display unit; acquiring current evaluations that indicate evaluations of fuel consumption of the hybrid vehicle in current travel by unit sections; acquiring previous evaluations that indicate evaluations of fuel consumption of the hybrid vehicle in previous travel prior to the current travel by unit sections; and indicating current evaluation icons that indicate the current evaluations and previous evaluation icons that indicate the previous evaluations together by unit sections on the map, wherein: each of the current evaluation icons and the previous evaluation icons is set to any one of an EV icon and an HV icon; the EV icon indicates that the hybrid vehicle has travelled an evaluation section within the corresponding unit section in the EV mode; and the HV icon indicates an evaluation of fuel consumption when the hybrid vehicle has travelled the evaluation section within the corresponding unit section in the HV mode.

A third aspect of the invention provides a computer-readable storage medium that stores computer-executable instructions for performing an evaluation indication function for a hybrid vehicle that includes an internal combustion engine and a motor and that is configured to travel in an HV mode in which the internal combustion engine is allowed to be driven or an EV mode in which the internal combustion engine is stopped. The evaluation indication function includes: displaying a current position of the hybrid vehicle and a map around the current position on a display unit; acquiring current evaluations that indicate evaluations of fuel consumption of the hybrid vehicle in current travel by unit sections; acquiring previous evaluations that indicate evaluations of fuel consumption of the hybrid vehicle in previous travel prior to the current travel by unit sections; and displaying current evaluation icons that indicate the current evaluations and previous evaluation icons that indicate the previous evaluations together by unit sections on the map, wherein: each of the current evaluation icons and the previous evaluation icons is set to any one of an EV icon and an HV icon; the EV icon indicates that the hybrid vehicle has travelled an evaluation section within the corresponding unit section in the EV mode; and the HV icon indicates an evaluation of fuel consumption when the hybrid vehicle has travelled the evaluation section within the corresponding unit section in the HV mode.

With the above configuration, the current evaluation icons and the previous evaluation icons may be indicated on the map so as to be visually recognized at the same time. As a result, the driver is able to drive while easily comparing the current evaluations of fuel consumption in a travel section with the previous evaluations of fuel consumption. Furthermore, each of the icons is any one of the EV icon and the HV icon, so the driver is able to determine whether an evaluation section of each unit section is travelled in the EV mode or in the HV mode.

BRIEF DESCRIPTION OF THE DRAWINGS

The features, advantages, and technical and industrial significance of this invention will be described below with reference to the accompanying drawings, in which like numerals denote like elements, and wherein:

FIG. 3 is a flow chart that shows an evaluation information indication process;

FIG. 5A is a view that shows an example of a map displayed and FIG. 5B, FIG. 5C and FIG. 5D are views that show examples in which evaluations are indicated by unit sections.

DETAILED DESCRIPTION OF THE EMBODIMENTS

Figure 1:
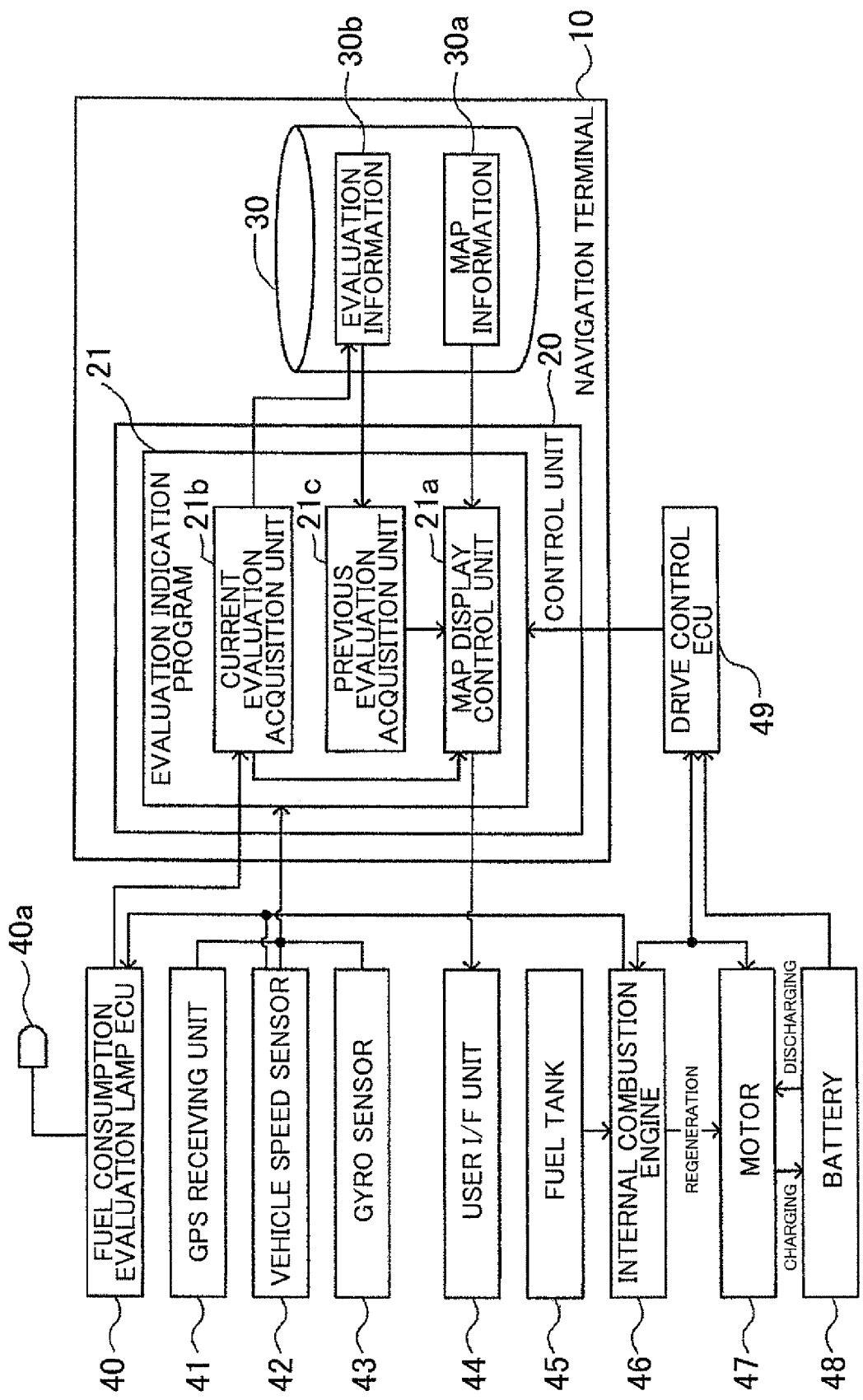
FIG. 1 is a block diagram that shows a navigation terminal that includes an evaluation indication system.

Hereinafter, embodiments of the invention will be described in accordance with the following order.
(1) Configuration of Navigation Terminal
(2) Evaluation Information Acquisition Process
(3) Evaluation Information Indication Process
(4) Alternative Embodiments (1) Configuration of Navigation Terminal FIG. 1 is a block diagram that shows the configuration of an evaluation indication system mounted on a hybrid vehicle. In the present embodiment, the evaluation indication system is implemented by a navigation terminal 10. The navigation terminal 10 includes a control unit 20 that has a CPU, a RAM, a ROM, and the like, and the control unit 20 executes programs stored in the ROM. In the present embodiment, the control unit 20 is able to execute a navigation program as one of the programs. The navigation program is a program that causes the control unit 20 to execute the function of displaying a map, including a current position of the hybrid vehicle, on a display unit of the navigation terminal and guiding a driver to a destination. The navigation program includes an evaluation indication program 21 that causes the display unit to display current evaluation icons and previous evaluation icons together.

The hybrid vehicle according to the present embodiment includes a fuel consumption evaluation lamp ECU 40, a GPS receiving unit 41, a vehicle speed sensor 42, a gyro sensor 43, a user I/F unit 44, a fuel tank 45, an internal combustion engine 46, a motor 47, a battery 48 and a drive control ECU 49. The GPS receiving unit 41 receives electric waves from UPS satellites and outputs a signal for calculating a current position of the hybrid vehicle through an interface (not shown). The control unit 20 acquires the signal output from the GPS receiving unit 41 to acquire the current position of the hybrid vehicle. The vehicle speed sensor 42 outputs a signal corresponding to the rotation speed of wheels equipped for the hybrid vehicle. The control unit 20 acquires the signal output from the vehicle speed sensor 42 via an interface (not shown) to acquire a vehicle speed. The gyro sensor 43 detects an angular acceleration of a turn of the hybrid vehicle in a horizontal plane and outputs a signal corresponding to the direction of the hybrid vehicle. The control unit 20 acquires the signal output from the gyro sensor 43 to acquire the travelling direction of the hybrid vehicle. The vehicle speed sensor 42, the gyro sensor 43, and the like, are utilized to, for example, correct the current position of the hybrid vehicle, determined on the basis of the output signal of the GPS receiving unit 41. In addition, the current position of the hybrid vehicle is corrected appropriately on the basis of the track of the hybrid vehicle.

The fuel consumption evaluation lamp ECU 40 includes a control circuit for evaluating the fuel consumption of the travelling hybrid vehicle on the basis of the operation of the hybrid vehicle. A lamp 40*a* is provided in an instrumental panel of the hybrid vehicle, and is connected to the fuel consumption evaluation lamp ECU 40. In the present embodiment, the fuel consumption evaluation lamp ECU 40 determines whether the hybrid vehicle is travelling in an operating state having a good travelling efficiency on the basis of a predetermined condition, and turns on the lamp 40*a* when the predetermined condition is satisfied. In the present embodiment, it is determined that the hybrid vehicle is travelling in an operating state having a good travelling efficiency in the case of the EV mode or in the case where driving for suppressing consumption of fuel is performed in the HV mode.

The fuel evaluation lamp ECU 40 determines whether the vehicle is travelling in a state where the internal combustion engine is not rotating on the basis of information that indicates the rotation speed of the internal combustion engine and output information of the vehicle speed sensor 42, and, when the vehicle is travelling in a state where the internal combustion engine is not rotating, determines that the vehicle is travelling in the EV mode. In addition, when the vehicle is travelling in a state where the internal combustion engine is rotating (in the case of the HV mode), the fuel evaluation lamp ECU 40 determines that driving for suppressing consumption of fuel is performed in the HV mode when a combination of information that indicates consumption of fuel, output information of the vehicle speed sensor 42 and information that indicates the state of a transmission coincides with a condition in which consumption of fuel is suppressed. The information that indicates consumption of fuel is, for example, information identified from a signal for operating an injector or information indicated by a fuel consumption sensor. Various conditions may be defined as the condition in which consumption of fuel is suppressed. In the present embodiment, when the consumption of fuel is smaller than or equal to a predetermined amount, the vehicle speed is higher than or equal to a predetermined threshold and the state of the transmission is a normal state (such as a drive mode other than a sporty mode that is a state for acceleration at high efficiency, or the like), the fuel consumption evaluation lamp ECU 40 determines that the combination of the above pieces of information coincides with the condition for suppressing consumption of fuel.

The fuel evaluation lamp ECU 40 turns on the lamp 40*a* when the vehicle is travelling in an operating state having a good travelling efficiency. As a result, the driver is able to determine that driving having a good travelling efficiency (consumption of fuel is suppressed) is performed when the lamp 40*a* is turned on and determine that driving having a poor travelling efficiency (consumption of fuel is excessively large) is performed when the lamp 40*a* is turned off. In addition, when the fuel consumption evaluation lamp ECU 40 turns on the lamp 40*a*, the fuel consumption evaluation lamp ECU 40 outputs information that indicates that the lamp 40*a* is turned on to the control unit 20. Thus, the control unit 20 is able to determine whether the lamp 40*a* is turned on or turned off on the basis of information output from the fuel consumption evaluation lamp ECU 40. Furthermore, the fuel consumption evaluation lamp ECU 40 outputs information that indicates the above described consumption of fuel to the control unit 20. The control unit 20 is able to determine the fuel consumption (km/l) at each position in the case where the hybrid vehicle is travelling in the HV mode on the basis of the information that indicates the consumption of fuel.

The user I/F unit 44 is an interface unit that inputs a driver's command and that is used to provide various pieces of information to the driver. The user I/F unit 44 includes an input unit, such as a switch and a display unit formed of a touch panel display (not shown), and a voice output unit, such as a speaker. The user I/F unit 44 receives a control signal from the control unit 20 and displays an image for providing various guides on the touch panel display.

The hybrid vehicle according to the present embodiment includes the internal combustion engine 46 powered by liquid fuel stored in the fuel tank 45 and the motor 47 powered by electric power stored in the battery 48. The internal combustion engine 46 and the motor 47 are coupled to a power transmission mechanism (not shown). The power transmission mechanism converts rotational driving force to propelling force of the vehicle to thereby drive the hybrid vehicle. In addition, the hybrid vehicle according to the present embodiment is configured to transmit part of rotational driving force generated by the internal combustion engine 46 to the motor 47 as regenerative energy. Electric power generated by the motor 47 using regenerative energy is stored in the battery 48.

The internal combustion engine 46 and the motor 47 are controlled by the drive control ECU 49. The drive control ECU 49 outputs a control signal to the internal combustion engine 46 and the motor 47, and executes control such that any one or both of the internal combustion engine 46 and the motor 47 generate rotational driving force. Thus, in the present embodiment, one of drive/stop of the internal combustion engine 46, charging using the motor 47 and drive of the motor 47 by discharging the battery 48 is selected in response to the control signal output from the drive control ECU 49. In addition, the drive control ECU 49 acquires the rotation speed of the internal combustion engine 46, and provides information about the rotation speed of the internal combustion engine 46 to the control unit 20. Furthermore, the drive control ECU 49 acquires a residual amount of electric power [%] (state of charge (SOC)) from the battery 48 and provides information about the residual amount of electric power to the control unit 20. The current residual amount of electric power of the battery 48 may be acquired on the basis of various parameters associated with the battery 48, corresponding to the residual amount of electric power. The residual amount of electric power may be identified on the basis of a voltage, a current, the pH of an electrolyte, or the like, other than the SOC.

Map information 30*a* is stored in a storage medium 30. The map information 30*a* includes node data, shape interpolation point data, link data, and the like. The node data indicate the positions, or the like, of nodes corresponding to end points of roads on which the hybrid vehicle travels. The shape interpolation point data indicate the positions, or the like, of shape interpolation points for determining the shape of a road between the nodes. The link data indicate links between the nodes. In addition, in the present embodiment, evaluation information 30*b* is stored in the storage medium 30 each time the hybrid vehicle travels. The evaluation information 30*b* indicates evaluations of fuel consumption of the hybrid vehicle. The evaluation information 30*b* includes information that indicates a rate of distance, at which the vehicle has travelled in the EV mode in a fuel consumption evaluation section within a unit section, and information that indicates a rate of distance, at which the above described lamp 40*a* has been turned on in the fuel consumption evaluation section within the unit section. In the present embodiment, when the evaluation information 30*b* is stored at the time when the vehicle is travelling toward a set destination, information that indicates the destination and a departure point is stored in association with the evaluation information 30*b*.

The control unit 20 executes the evaluation indication program 21 included in the navigation program to display a map, including current evaluation icons and previous evaluation icons, on the display unit of the user I/F unit 44. In addition, in the present embodiment, the current evaluation icons and the previous evaluation icons each may be expressed by any one of an EV icon and an HV icon. The evaluation indication program 21 includes a map display control unit 21*a*, a current evaluation acquisition unit 21*b* and a previous evaluation acquisition unit 21*c*.

The map display control unit 21*a* is a program module that causes the control unit 20 to implement the function of displaying a current position of the hybrid vehicle together with a map around the current position on the display unit of the user I/F unit 44 and indicating current evaluation icons and previous evaluation icons together (at the same time) by unit sections on the map. Specifically, the control unit 20 determines the current position of the hybrid vehicle on the basis of the output signals of the GPS receiving unit 41, vehicle speed sensor 42 and gyro sensor 43, determines the display range of the map around the current position of the hybrid vehicle, and extracts information about roads, facilities, and the like, in the display range from the map information 30*a*. Then, the control unit 20 outputs a control signal for displaying the current position of the hybrid vehicle and a control signal for drawing a map that indicates roads, facilities, and the like, around the current position to the display unit of the user I/F unit 44. As a result, the display unit of the user I/F unit 44 displays the map that indicates the roads, facilities, and the like, around the current position of the hybrid vehicle and the current position of the hybrid vehicle.

The current evaluation acquisition unit 21*b* is a program module that causes the control unit 20 to implement the function of acquiring current evaluations that indicate evaluations of fuel consumption of the hybrid vehicle in current travel by unit sections. The unit section is a section of a set distance (for example, 100 m) in the present embodiment. The control unit 20 executes evaluation information acquisition process (described later) while the hybrid vehicle is travelling, acquires the EV running rate in each unit section and the turn-on rate of the lamp 40*a* in each unit section, and stores the EV running rate and turn-on rate of the lamp 40*a* in each unit section as the evaluation information 30*b*. Current evaluations and previous evaluations are determined using the evaluation information 30*b*.

In the present embodiment, when the driver operates the user I/F unit 44 to set a destination, the function of the navigation program sets the current position of the hybrid vehicle at the time when the destination is set as a departure point and searches for a route from the departure point to the destination to guide the driver. Travel from the departure point to the destination at present is regarded as current travel. In addition, a current travel section that is a section in which the hybrid vehicle has currently travelled is a section from a departure point at a start point to a current position at an end point. A travel distance of the current travel section increases as the hybrid vehicle travels until the hybrid vehicle reaches the destination. When the hybrid vehicle has travelled and reached the set destination, the control unit 20 stores the evaluation information 30*b* for unit sections from the departure point to the destination in association with the departure point and the destination.

The control unit 20 determines current evaluations regarding current travel from the evaluation information 30*b* through the process executed by the current evaluation acquisition unit 21*b*. Therefore, the control unit 20 acquires the evaluation information 30*b* for each unit section in the current travel section after the hybrid vehicle starts travelling at the departure point before the hybrid vehicle reaches the destination. Then, when the EV running rate in each unit section, indicated by the evaluation information 30*b*, is higher than or equal to a first predetermined rate (for example, 100%, 90%, or the like), the control unit 20 sets an evaluation of the unit section as an evaluation that indicates that the vehicle has travelled the evaluation section within the unit section in the EV mode. On the other hand, when the EV running rate in each unit section, indicated by the evaluation information 30*b*, is not higher than or equal to the first predetermined rate, the turn-on rate of the lamp 40*a* (the rate of distance that the vehicle has travelled in a state where the lamp 40*a* is turned on) in each unit section, indicated by the evaluation information 30*b*, is compared with a second predetermined rate. As a result, the control unit 20 determines that the evaluation of fuel consumption is "good" when the turn-on rate of the lamp 40*a* is higher than or equal to the second predetermined rate, determines that the evaluation of fuel consumption is "bad" when the turn-on rate of the lamp 40*a* is lower than the second predetermined rate, and sets the evaluation of fuel consumption as a current evaluation for each unit section. In the HV mode, as the turn-on rate of the lamp 40*a* increases, the fuel consumption decreases, so the turn-on rate of the lamp 40*a* corresponds to the frequency of driving operation that contributes to improved fuel consumption. Thus, it is possible to evaluate whether there is driving operation for improving the fuel consumption by using the turn-on rate of the lamp 40*a*. As described above, in the present embodiment, the evaluation of fuel consumption in the HV mode is any one of "good" and "bad". The second predetermined rate just needs to be determined at the time of evaluating the fuel consumption, and, in the present embodiment, the second predetermined rate is set on the basis of a diagnostic difficulty level set by the driver in advance. That is, the second predetermined rate is set so as to increase as the diagnostic difficulty level increases.

Furthermore, in the present embodiment, the control unit 20 acquires a current average fuel consumption that indicates the average fuel consumption of the hybrid vehicle in current travel through the process executed by the current evaluation acquisition unit 21*b*. That is, when the hybrid vehicle has travelled toward a set destination, the control unit 20 determines the fuel consumption of the hybrid vehicle at respective positions on the basis of information that indicates consumption of fuel from a departure point to a current position, and averages the fuel consumptions at the respective positions. Then, the control unit 20 associates the averaged fuel consumption (average fuel consumption) with the departure point and the destination, and stores the averaged fuel consumption as the evaluation information 30*b*. Then, the control unit 20 acquires the average fuel consumption regarding the current travel as a current average fuel consumption among the average fuel consumptions indicated by the evaluation information 30*b* through the process executed by the current evaluation acquisition unit 21*b*. The average fuel consumption included in the evaluation information 30*b* is sequentially updated as the hybrid vehicle travels. Thus, before the hybrid vehicle reaches the destination, the average fuel consumption in process in which the hybrid vehicle travels from the departure point to a point behind the destination in the travelling direction is stored in association with the departure point and the destination. On the other hand, when the hybrid vehicle reaches the destination, the average fuel consumption in process in which the hybrid vehicle travels from the departure point to the destination is stored in association with the departure point and the destination.

The previous evaluation acquisition unit 21*c* is a program module that causes the control unit 20 to implement the function of acquiring previous evaluations that indicate evaluations of fuel consumption of the hybrid vehicle in the past prior to the current travel by unit sections. In the present embodiment, the control unit 20 regards travel of the hybrid, in which the vehicle has departed from the same point as the departure point of the current travel and reached to the same point as the destination of the current travel in the past prior to the current travel, as previous travel for which previous evaluation icons are displayed. Then, the control unit 20 acquires an evaluation for each unit section within a section in which the hybrid vehicle has travelled in previous travel as a previous evaluation.

Therefore, the control unit 20 acquires the evaluation information 30b (information that indicates the EV running rate and information that indicates the turn-on rate of the lamp 40a) with which the same departure point and destination as those of the above described current travel are associated. When a plurality of pieces of the evaluation information 30b with which the same departure point and destination as those of the current travel are associated, for example, from among the pieces of evaluation information 30b associated with the same departure point and destination, the evaluation information 30b having the best average fuel consumption (that is, the evaluation information 30b having the lowest average fuel consumption in the past) may be acquired as a previous evaluation. Then, when the EV running rate in each unit section, indicated by the evaluation information 30b, is higher than or equal to the first predetermined rate, the control unit 20 sets an evaluation of the unit section as an evaluation that indicates that the vehicle has travelled the evaluation section within the unit section in the EV mode. On the other hand, when the EV running rate in each unit section, indicated by the evaluation information 30b, is not higher than or equal to the first predetermined rate, the turn-on rate of the lamp 40a, indicated by the evaluation information 30b, is compared with the second predetermined rate, and an evaluation of the fuel consumption is determined as "good" when the turn-on rate of the lamp 40a is higher than or equal to the second predetermined rate; whereas an evaluation of the fuel consumption is determined as "bad" when the turn-on rate of the lamp 40a is smaller than the second predetermined rate. In order to determine whether the departure point and the destination are the same between current travel and previous travel, a predetermined margin is provided at the position of each point and then, for example, when the distance between two points is shorter than or equal to 300 m, the two points may be regarded as the same point.

Furthermore, in the present embodiment, the control unit 20 acquires a previous average fuel consumption that indicates the average fuel consumption of the hybrid vehicle in the previous travel through the process executed by the previous evaluation acquisition unit 21c. That is, the control unit 20 consults the evaluation information 30b, extracts the lowest average fuel consumption from among the fuel consumptions included in the evaluation information 30b with which the same departure point and destination as those of the above described current travel are associated, and acquires the lowest average fuel consumption as the previous average fuel consumption through the process executed by the previous evaluation acquisition unit 21c. In the present embodiment, an average fuel consumption is determined each time the vehicle travels from a departure point to a destination once and then the lowest average fuel consumption is extracted from among the previous one or more average fuel consumptions to acquire the previous average fuel consumption; instead, a value obtained by averaging a plurality of previous average fuel consumptions may be obtained as the previous average fuel consumption.

When the current evaluations, the previous evaluations, the current average fuel consumption and the previous average fuel consumption are acquired, the control unit 20 outputs a control signal for drawing the current evaluation icons, the previous evaluation icons, the current average fuel consumption and the previous average fuel consumption on the map to the display unit of the user I/F unit 44 through the process executed by the map display control unit 21a. In order to display the current evaluation icons and the previous evaluation icons, the control unit 20 extracts a section travelled in current travel and a section travelled in previous travel from the map currently displayed on the display unit of the user I/F unit 44. Then, the control unit 20 determines current evaluations and previous evaluations by unit sections in the respective sections, determines current evaluation icons that indicate the current evaluations and previous evaluation icons that indicate the previous evaluations, and outputs a control signal for drawing the current evaluation icons and the previous evaluation icons on the map to the display unit of the user I/F unit 44. As a result, the display unit of the user I/F unit 44 displays the current evaluation icons and previous evaluation icons by unit sections, the current average fuel consumption and the previous average fuel consumption.

In the present embodiment, the icons are icons that allow contrasting between a current evaluation and a previous evaluation and are icons that allow contrasting between the EV mode and the HV mode. In the present embodiment, the outer periphery of an icon that indicates an evaluation regarding current travel is indicated by the solid line, and the outer periphery of an icon that indicates an evaluation regarding previous travel is indicated by the broken line. That is, the driver is allowed to recognize whether an icon indicates an evaluation regarding current travel or an evaluation regarding previous travel on the basis of whether the outer periphery of the icon is indicated by the solid line or the broken line. On the other hand, the outer periphery of an icon that indicates the EV mode is shaped like a vehicle, and the icon has a string "EV" inside. In addition, the outer periphery of an icon that indicates the HV mode is shaped like a leaf. That is, the driver is allowed to recognize whether an icon indicates the EV mode or the HV mode on the basis of the shape of the outer periphery of the icon. In an icon that indicates the HV mode, the evaluation of fuel consumption, that is, "good" or "bad", is indicated by the color inside (in the present embodiment, outlined or hatched).

FIG. 5A shows an example of a map displayed on the display unit. In this example, an icon C that indicates the current position of a hybrid vehicle is shown on a road R indicated by the solid curve. FIG. 5A shows a state where previous evaluation icons Epe, Epg and Epb of which the outer periphery is indicated by the broken line are displayed on the road R ahead of the icon C (ahead of the vehicle in the travelling direction). The previous evaluation icon Epe has the outer periphery shaped like a vehicle and indicates a unit section travelled in the EV mode in previous travel. Thus, the icon Epe is a previous evaluation icon and is an EV icon that indicates that the vehicle has travelled in the EV mode. The previous evaluation icons Epg and Epb each have the outer periphery shaped like a leaf and each indicate a unit section travelled in the HV mode in previous travel. Between the previous evaluation icons Epg and Epb, the outlined previous evaluation icon Epg indicates a unit section in which the evaluation is "good", and the hatched previous evaluation icon Epb indicates a unit section in which the evaluation is "bad".

In addition, FIG. 5A shows a state where the current evaluation icons Ete, Etg and Etb of which the outer periphery is indicated by the solid line are displayed on the road R behind the icon C (behind the vehicle in the travelling direction). The current evaluation icon Ete has the outer periphery shaped like a vehicle and indicates a unit section travelled in the EV mode in current travel. Thus, the icon Ete is a current evaluation icon and is an EV icon that indicates that the vehicle has travelled in the EV mode. The current evaluation icons Etg and Etb each have the outer periphery shaped like a leaf and each indicate a unit section travelled in the HV mode in current travel. Between the current evaluation icons Etg and Etb, the outlined current evaluation icon Etg indicates a unit section in which the evaluation is "good", and the hatched current evaluation icon Etb indicates a unit section in which the evaluation is "bad". Thus, the icons Etg and Etb each are a current evaluation icon and are an HV icon that indicates that the vehicle has travelled in the HV mode. In addition, in the example shown in FIG. 5A, a rectangular region T is provided at the lower right side of the map displayed on the display unit, and a current average fuel consumption (24.5 km/l in the drawing) and a previous average fuel consumption (23.9 km/l in the drawing) are indicated in the region T. The wide line drawn on the road R indicates a scheduled travel route for reaching a destination from a departure point in current travel.

As described above, according to the present embodiment, the current evaluation icons and the previous evaluation icons are displayed on the map displayed on the display unit of the user I/F unit 44 such that the current evaluation icons and the previous evaluation icons may be visually recognized at the same time. As a result, the driver is able to drive while easily comparing the current evaluations of fuel consumption with the previous evaluations of fuel consumption. In addition, in the present embodiment, the current evaluation icons and the previous evaluation icons are displayed on the map in different modes (in the example shown in FIG. 5A, the solid line and the broken line) such that the current evaluations and the previous evaluations may be distinguished from each other. Thus, the driver is able to clearly distinguish the current evaluations and the previous evaluations from each other without any confusion. In addition, in the present embodiment, the EV icon and the HV icon are displayed on the map in different modes (in the example shown in FIG. 5A, the outer peripheral shapes are vehicle and leaf) such that the EV mode and the HV mode may be distinguished from each other. Thus, the driver is able to clearly distinguish the EV mode and the HV mode from each other without any confusion.

Here, the current evaluations and the previous evaluations are defined by unit sections. In current travel and in previous travel, the vehicle usually travels a plurality of unit sections, so current evaluation icons and previous evaluation icons in a plurality of successive unit sections are indicated on the map. When the current evaluation is indicated by the HV icon, the evaluation indicates that the fuel consumption is good or bad. On the other hand, when the current evaluation is indicated by the EV icon, it indicates a state where the vehicle travels not using the internal combustion engine but using the motor and a state where fuel for driving the internal combustion engine is not consumed. Thus, when the current evaluation icons and the previous evaluation icons are indicated on the map, the driver is allowed to recognize in which one of the EV mode and the HV mode the hybrid vehicle has travelled in each unit section in current travel and in previous travel. In addition, in the case of the HV mode, the driver is allowed to recognize whether the fuel consumption is good or bad over a plurality of unit sections. Furthermore, the driver is allowed to understand the rate of unit section in which the hybrid vehicle has travelled in the EV mode in current travel from the ratio of the EV mode to the HV mode over a plurality of travelled unit sections in the current travel. Then, the driver is allowed to obtain a guideline for continuing the EV mode for a long period of time as much as possible on the basis of how far the hybrid vehicle has travelled in the EV mode in previous travel and in current travel. Similarly, the driver is able to understand the rate of unit section in which the hybrid vehicle has travelled in the EV mode in previous travel from the ratio of the EV mode to the HV mode over a plurality of travelled unit sections in the previous travel. Thus, when the rate of unit section in which the hybrid vehicle has travelled in the EV mode in previous travel is high, the driver is able to estimate that the driver has driven while suppressing consumption of liquid fuel in the previous travel.

For example, FIG. 5B shows an example in which previous evaluation icons corresponding to unit sections Z1 to Z5 all are the EV icons Epe. In this example, the driver is allowed to recognize that previous travel in each of the unit sections Z1 to Z5 is a travel in the EV mode. On the other hand, when there is a unit section in which the current evaluation icon is the HV icon Etg in any one of the unit sections Z1 to Z5 as shown in FIG. 5C and FIG. 5D, the driver is allowed to recognize that the hybrid vehicle has currently travelled in the HV mode although the hybrid vehicle could have travelled in the EV mode in the past in that unit section. This is presumably because of the following two factors.

Factor 1: In the current travel, the SOC did not allow a travel in the EV mode.

Factor 2: Driving operation in the current travel resulted in inefficient driving (for example, excessive accelerator operation was performed).

When the hybrid vehicle has travelled in the EV mode successively over the plurality of unit sections Z1 to Z5 in the previous travel as shown in FIG. 5B and the hybrid vehicle has not travelled in the EV mode successively over the plurality of unit sections Z2 to Z5 in the current travel as shown in FIG. 5C, it may be assumed that the cause of a decrease in evaluation is factor 1. In a case where the hybrid vehicle has travelled in the EV mode successively over the plurality of unit sections Z1 to Z5 in the past, it is assumed that it is easy for the driver to drive the vehicle in the EV mode in the plurality of unit sections Z1 to Z5. When the hybrid vehicle has not currently travelled in the EV mode successively over the plurality of unit sections Z1 to Z5, it is reasonable to assume that the hybrid vehicle has not travelled in the EV mode because of driver's technique but the hybrid vehicle was not able to travel in the EV mode because of a decrease in the SOC of the battery 48. Thus, the driver is able determine not to use evaluations in the unit sections Z2 to Z5 in the current travel as a guideline of the next and following driving operations. When there are successive unit sections in which the hybrid vehicle has travelled in the EV mode in the previous travel but has not travelled in the EV mode in the current travel (for example, when there are successive evaluations of the unit sections Z2 to Z5 shown in FIG. 5B and FIG. 5C) as well, it may be assumed that the cause of a decrease in evaluation is factor 1.

On the other hand, when the hybrid vehicle has travelled in the EV mode in the previous travel successively over the plurality of unit sections Z1 to Z5 as shown in FIG. 5B and a unit section in which the hybrid vehicle has not travelled in the EV mode discretely appears within the plurality of unit sections Z1 to Z5, it may be assumed that the cause of a decrease in evaluation is factor 2. That is, when the hybrid vehicle has travelled in the EV mode over the plurality of unit sections Z1 to Z5 before and after the unit section Z4 in the previous travel as shown in FIG. 5B but the hybrid vehicle has not travelled in the EV mode in the unit section Z4 in the current travel although the hybrid vehicle has travelled in the EV mode over the unit sections Z1 to Z3 and Z5 as shown in FIG. 5D, it is less likely that the SOC became a state where the hybrid vehicle was not able to travel in the EV mode in the unit section Z4. Thus, the driver keeps in mind so as to efficiently drive the hybrid vehicle in the unit section Z4 to thereby make it possible to increase the number of unit sections travelled in the EV mode.

Figure 6A:
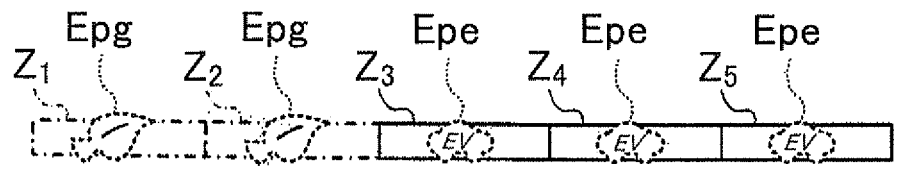
FIG. 6A and FIG. 6B are views that show examples in which evaluations are indicated by unit sections and FIG. 6C is a view that shows an example of a map displayed.
Figure 6B:
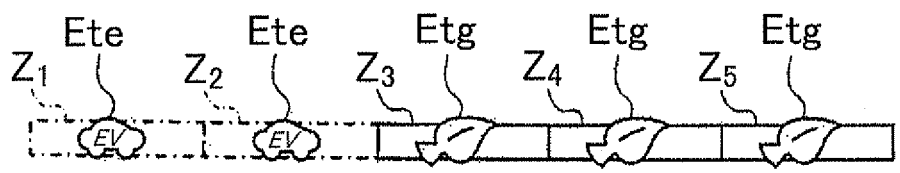

Furthermore, it is possible to obtain a guideline for driving the hybrid vehicle in the EV mode in a unit section in which it is better for the hybrid vehicle to travel in the EV mode in order to improve the fuel consumption. FIG. 6A and FIG. 6B show examples in which unit sections Z1 and Z2 indicated by the alternate long and short dash line are uphills, and unit sections Z3 to Z5 indicated by the solid line are downhills. In the hybrid vehicle according to the present embodiment, regenerative brake that stores electric power, generated by regenerative energy, in the battery 48 may be utilized. Regenerative brake is mainly utilized on a downhill. Then, on a road in which a downhill continues after an uphill, it is desirable that the hybrid vehicle travels in the EV mode in an uphill section and travels in the HV mode in a following downhill section to charge the battery 48 with electric power through regenerative brake.

For example, as shown in FIG. 6A, when the hybrid vehicle has travelled in the HV mode in the uphill unit sections Z1 and Z2 and has travelled in the EV mode in the downhill unit sections Z3 to Z5 in the previous travel, the driver is allowed to recognize that the previous travel in these unit sections Z1 to Z5 is not ideal travel. In addition, the driver is able to obtain a guideline that the hybrid vehicle should travel in the EV mode in the uphill unit sections Z1 and Z2 and should travel in the HV mode in the downhill unit sections Z3 to Z5. In the current travel, when the hybrid vehicle has travelled in the EV mode in the uphill unit sections Z1 and Z2 and has travelled in the HV mode in the downhill unit sections Z3 to Z5 as shown in FIG. 6B, the driver is able to make sure that the hybrid vehicle has actually ideally travelled in the current travel.

Furthermore, when the current evaluation icons are the HV icons, the driver is able to understand whether the total fuel consumption amount tends to be suppressed or the total fuel consumption amount tends to be large in a plurality of travelled unit sections, on the basis of whether the evaluations of fuel consumption over the plurality of travelled unit sections are good or bad. For example, in the example shown in FIG. 5A, it may be understood that the total fuel consumption amount tends to be suppressed when the number of solid-line hatched icons Etb is small and the total fuel consumption amount tends to be large when the number of icons Etb is large.

When the previous evaluation icons are the HV icons, the driver is able to recognize the previous evaluations over the plurality of unit sections. Then, the driver is able to understand that the total fuel consumption amount tends to be suppressed or the total fuel consumption amount tends to be large in the past, on the basis of whether the previous evaluations over the plurality of unit sections are good or bad. Thus, in a section in which the total fuel consumption amount tends to be suppressed in the past, the driver is able to estimate that the driver easily drives while suppressing consumption of fuel at the time of travelling the same section again. On the other hand, in a section in which the total fuel consumption amount tends to be large in the past, the driver is able to estimate that there is room for improvement of the fuel consumption at the time of travelling that section. That is, the driver is able to determine a guideline of travel in a section travelled in the past on the basis of the evaluation of the fuel consumption in that section. For example, in the example shown in FIG. 5A, from the current position C, the total fuel consumption amount tends to be suppressed in a section other than a section Zb, and the driver is able to estimate that the driver easily drives while suppressing consumption of fuel at the time of travelling the same section again. In addition, the total fuel consumption amount tends to be large in the section Zb, and the driver is able to estimate that there is room for improvement of the fuel consumption at the time of travelling the section Zb.

In the present embodiment, the current evaluation icons of the respective unit sections and the previous evaluation icons of the respective unit sections are displayed together on the map, so the driver is able to drive while contrasting the current evaluations with the previous evaluations over the plurality of unit sections. Generally, the driver cannot stare at the display unit while the hybrid vehicle is running, and the driver is just able to intermittently visually recognize information indicated on the display unit. Even when the evaluation of fuel consumption at an instance at which the hybrid vehicle is travelling at a current position is intermittently recognized and is compared with a previous evaluation, it is difficult to determine whether a fuel consumption amount may be suppressed in process from a start of travel to an end of travel.

However, in the present embodiment, because the current evaluation icons and previous evaluation icons of the respective unit sections are indicated on the map together, the driver is able to understand that the current evaluations and the previous evaluations of the plurality of unit sections at sight. Thus, the driver contrasts current evaluations with previous evaluations in unit sections that may be travelled from the current position to thereby make it possible to drive while determining a guideline of travel in a section to be travelled in the future (section travelled in the past) on the basis of a degree of the total fuel consumption amount in current travel. For example, according to the example shown in FIG. 5A, the driver is able to understand the ratio of the icon Ete that is the current evaluation indicating that the hybrid vehicle has travelled in the EV mode, the icon Etg indicating the "good" current evaluation and the icon Etb indicating the "bad" current evaluation. Thus, it is possible to recognize whether the total fuel consumption amount is relatively large or small in the current travel up to the current position on the basis of the ratio of the icons Ete, Etg and Etb.

In addition, the driver is able to understand the ratio of the icon Epe that is the previous evaluation indicating that the hybrid vehicle has travelled in the EV mode, the icon Epg indicating a "good" previous evaluation and the icon Epb indicating a "bad" previous evaluation with just a glance at the map. Thus, it is possible to understand a section in which the total fuel consumption amount is relatively large and a section in which the total fuel consumption amount is relatively small in the previous travel of a section from the current position on the basis of the ratio of the icons Epe, Epg and Epb. For example, in the example shown in FIG. 5A, it is possible to immediately visually recognize the section Zb in which the total fuel consumption amount is relatively large and the section Ze in which the total fuel consumption amount is extremely small. Then, for example, when the total fuel consumption amount in current travel is relatively large and the driver intends to suppress the fuel consumption amount in the following travel, the driver is able to estimate that the fuel consumption may be improved by suppressing an accelerator operation amount in a section in which the total fuel consumption amount tends to be large in previous travel. In addition, the driver is able to estimate that the consumption of fuel may be suppressed even when the driver does not excessively carefully drive in a section in which the total fuel consumption amount is suppressed in previous travel.

When a currently travelled section coincides with a previously travelled section, that is, when the hybrid vehicle has currently travelled a section in which previous evaluation icons are displayed, it is possible to contrast the current evaluations with the previous evaluations in the same unit section. In this case, the driver is able to recognize how the current evaluations have varied in comparison with the previous evaluations. Thus, the driver is able to drive while understanding whether the total fuel consumption amount in a currently travelled section is improved as compared with that in the past.

When a departure point and a destination are the same between current travel and previous travel, usually, the navigation program searches for the same route. When the current travel and the previous travel use the same route, the current evaluation icons Ete, Etg and Etb are displayed for the route from the departure point to the current position as shown in FIG. 5A. The previous evaluation icons Epe, Epg and Epb are displayed for at least a route from the current position to the destination. In this case, the previous evaluation icons Epe, Epg and Epb indicate evaluations of fuel consumption of the hybrid vehicle in the case where the hybrid vehicle has travelled a section, including the current position C, in the past prior to the current travel. That is, the section in which the previous evaluation icons Epe, Epg and Epb are displayed includes a road on which the hybrid vehicle travels after the current position C as shown in FIG. 5A. Therefore, the driver recognizes the previous evaluation icons Epe, Epg and Epb after the current position and, in addition, is able to drive while contrasting them with the current evaluation icons Ete, Etg and Etb before the current position. Thus, according to the present embodiment, at the time of currently travelling from a departure point toward a destination, the driver is able to drive while determining a guideline for suppressing the total fuel consumption as compared with previous travel.

Furthermore, in the present embodiment, in addition to the evaluations of fuel consumption of the respective unit sections, a current average fuel consumption and a previous average fuel consumption, which are the evaluations of fuel consumption over the plurality of unit sections, are indicated on the display unit of the user I/F unit 44 (indicated in the lower right rectangular region T in FIG. 5A). Thus, the driver is able to recognize the current average fuel consumption and the previous average fuel consumption that are the evaluations over the plurality of unit sections in addition to the current evaluations and previous evaluations of the respective unit sections, so it is possible to further easily determine a current total fuel consumption and a previous total fuel consumption.

(2) Evaluation Information Acquisition Process

Figure 2A:
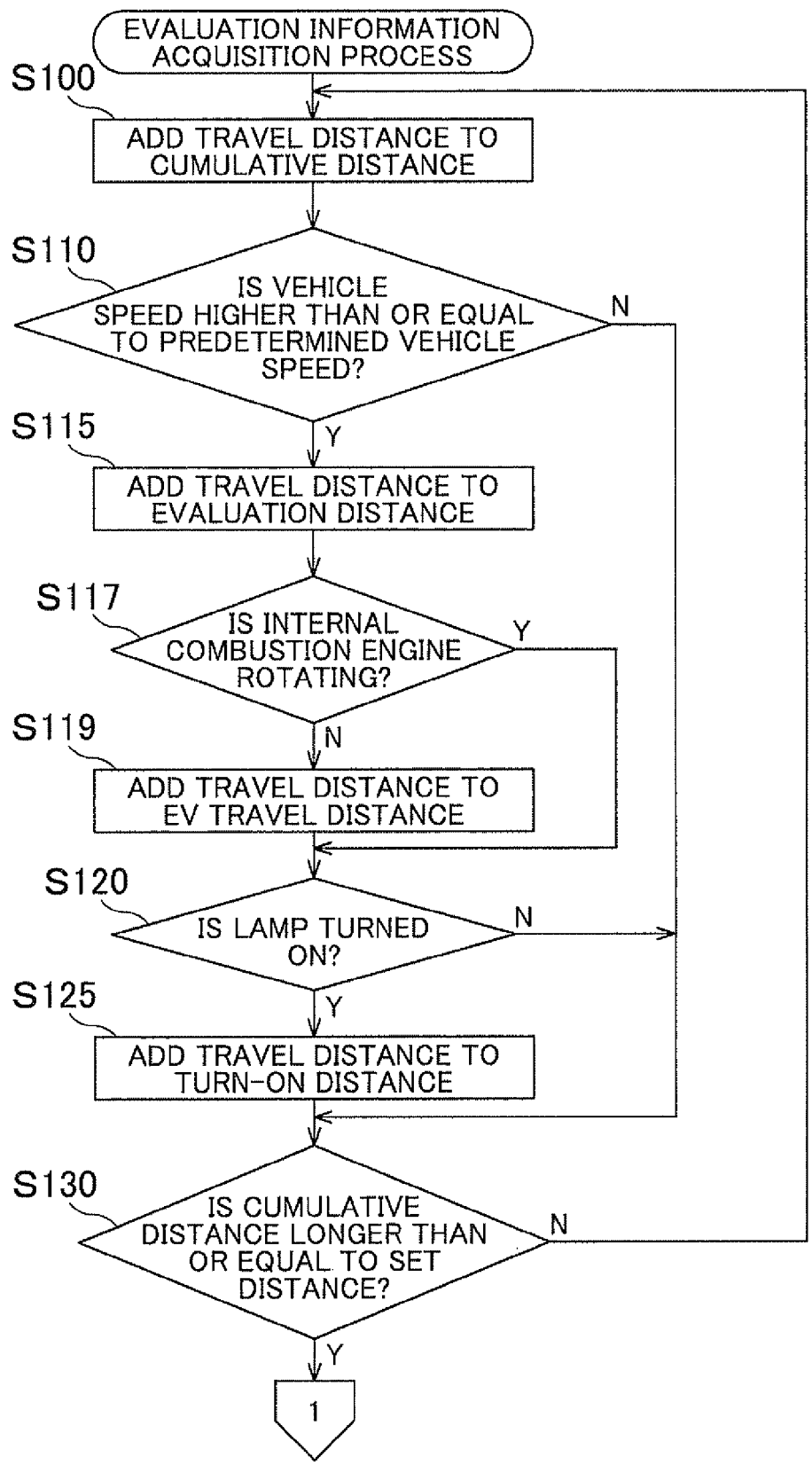
FIG. 2A and FIG. 2B are flow charts that show an evaluation information acquisition process.
Figure 2B:
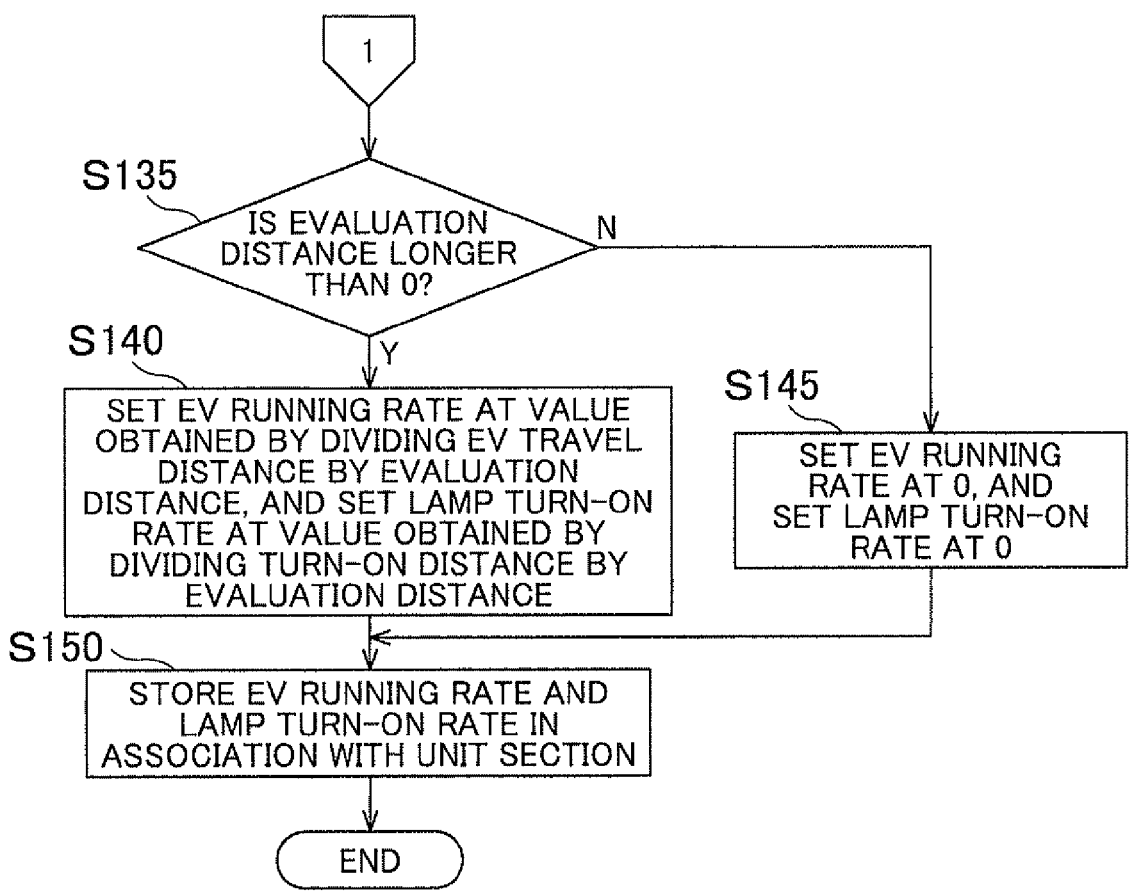

Next, the evaluation information acquisition process will be described in detail. FIG. 2A and FIG. 2B are flow charts of the evaluation information acquisition process. In the present embodiment, the control unit 20 executes the evaluation information acquisition process using the current evaluation acquisition unit 21b after the hybrid vehicle starts travelling toward a set destination. Before the evaluation information acquisition process is executed, the control unit 20 initializes a variable that indicates a cumulative distance for determining whether the hybrid vehicle has travelled a set distance defined as the length of a unit section, a variable that indicates an evaluation distance for determining a distance that an evaluation of fuel consumption is allowed within the unit section, a variable that indicates an EV running distance for determining a distance that the hybrid vehicle has travelled in the EV mode and a variable that indicates a turn-on distance for determining a distance that the hybrid vehicle has travelled in a state where the lamp 40a is turned on.

The control unit 20 adds a travel distance to the cumulative distance (step S100). In the present embodiment, steps S100 to S130 form a loop process, and the process of step S100 is executed at a set interval (for example, 100 ms) when the loop process is repeated. Then, the control unit 20 determines a travel distance ΔL that the hybrid vehicle has travelled during a period from when step S100 is previously executed to when step S100 is currently executed on the basis of the output signals of the GPS receiving unit 41, vehicle speed sensor 42 and gyro sensor 43, and adds the travel distance ΔL to the cumulative distance. That is, the control unit 20 executes adding process such that a value that indicates a total distance that the hybrid vehicle has travelled during a period in which steps S100 to S130 are repeated becomes the cumulative distance.

Subsequently, the control unit 20 determines whether the vehicle speed is higher than or equal to a predetermined vehicle speed (step S110), and, when it is not determined that the vehicle speed is higher than or equal to the predetermined vehicle speed, steps S115 to S125 are skipped. On the other hand, in step S110, when it is determined that the vehicle speed is higher than or equal to the predetermined vehicle speed, the control unit 20 adds the travel distance to the evaluation distance (step S115). That is, the above described travel distance ΔL added to the cumulative distance in step S100 is added to the evaluation distance.

The predetermined vehicle speed, which is a determination condition used in determination of step S110, just needs to be defined in advance as a vehicle speed (for example, 4 km/h) below which a significant evaluation of fuel consumption cannot be performed. That is, when the vehicle speed is excessively low, it is difficult to distinguish driving operation in which consumption of fuel is suppressed and driving operation in which fuel is excessively consumed from each other, so the fuel consumption is not evaluated in the case where the vehicle speed is lower than the predetermined speed. Thus, in the present embodiment, when the vehicle speed is lower than the predetermined vehicle speed, it is considered that a significant evaluation of fuel consumption cannot be performed and then step S115 is not executed; whereas, when the vehicle speed is higher than or equal to the predetermined vehicle speed, it is considered that a significant evaluation of fuel consumption can be performed and then the evaluation distance is increased by the travel distance ΔL in step S115. The predetermined vehicle speed may be equal to a predetermined threshold of vehicle speed, set as one of conditions at the time when the fuel consumption evaluation lamp ECU 40 turns on the lamp 40a.

Furthermore, the control unit 20 determines whether the internal combustion engine 46 is rotating on the basis of the output signal of the drive control ECU 49 (step S117), and, when it is determined that the internal combustion engine 46 is rotating, skips step S119. On the other hand, when it is not determined in step S117 that the internal combustion engine 46 is rotating, the control unit 20 adds the travel distance to an EV travel distance (step S119). That is, when it is allowed to perform a significant evaluation of fuel consumption and the internal combustion engine is not rotating, the control unit 20 assumes that the hybrid vehicle is travelling in the EV mode, and adds the above described travel distance ΔL, added to the cumulative distance in step S100, to the EV travel distance.

Furthermore, the control unit 20 determines whether the lamp 40a is turned on (step S120), and, when it is not determined that the lamp 40a is turned on, step S125 is skipped. On the other hand, in step S120, when it is determined that the lamp 40a is turned on, the control unit 20 adds the travel distance to the turn-on distance (step S125). That is, when it is allowed to perform a significant evaluation of fuel consumption and the lamp 40a is turned on, the control unit 20 adds the above described travel distance ΔL, added to the cumulative distance in step S100, to the turn-on distance.

Subsequently, the control unit 20 determines whether the cumulative distance is longer than or equal to a set distance (step S130), and repeats the processes of step S100 and the following steps until it is determined in step S130 that the cumulative distance is longer than or equal to the set distance. That is, when the cumulative distance is longer than or equal to the set distance that is defined in advance as the distance of the unit section, the control unit 20 considers that the hybrid vehicle has travelled the unit section and exits from the loop process of steps S100 to S130.

When it is determined in step S130 that the cumulative distance is longer than or equal to the set distance, the control unit 20 determines whether the evaluation distance is longer than 0 (step S135). That is, it is determined whether there is a section in which a significant evaluation is allowed during the hybrid vehicle travels the unit section. When it is determined in step S135 that the evaluation distance is longer than 0, the control unit 20 sets the EV running rate at a value obtained by dividing the EV travel distance by the evaluation distance, and sets the turn-on rate of the lamp 40a at a value obtained by dividing the turn-on distance by the evaluation distance (step S140). On the other hand, when it is not determined in step S135 that the evaluation distance is longer than 0, the control unit 20 sets the EV running rate at 0, and sets the turn-on rate of the lamp 40a at 0 (step S145). That is, when the evaluation distance (denominator for evaluating the EV running rate and the turn-on rate of the lamp 40a) is 0, the EV running rate and the turn-on rate of the lamp 40a cannot be calculated because of the definition of the EV running rate and the definition of the turn-on rate of the lamp 40a, so the EV running rate and the turn-on rate of the lamp 40a are set at 0. The EV running rate and the turn-on rate in the case where the evaluation distance is 0 may be, for example, unevaluable.

Subsequently, the control unit 20 stores the EV running rate and the turn-on rate of the lamp 40a, set in step S140 or S145, in the storage medium 30 as the evaluation information 30b in association with the unit section (step S150). According to the above process, the evaluation information 30b for each unit section may be stored in the storage medium 30. When the evaluation information acquisition process is executed in a state where the destination of the hybrid vehicle is set, the control unit 20 stores information that indicates the destination and the departure point in association with the evaluation information 30b in step S150.

(3) Evaluation Information Indication Process

Figure 4:
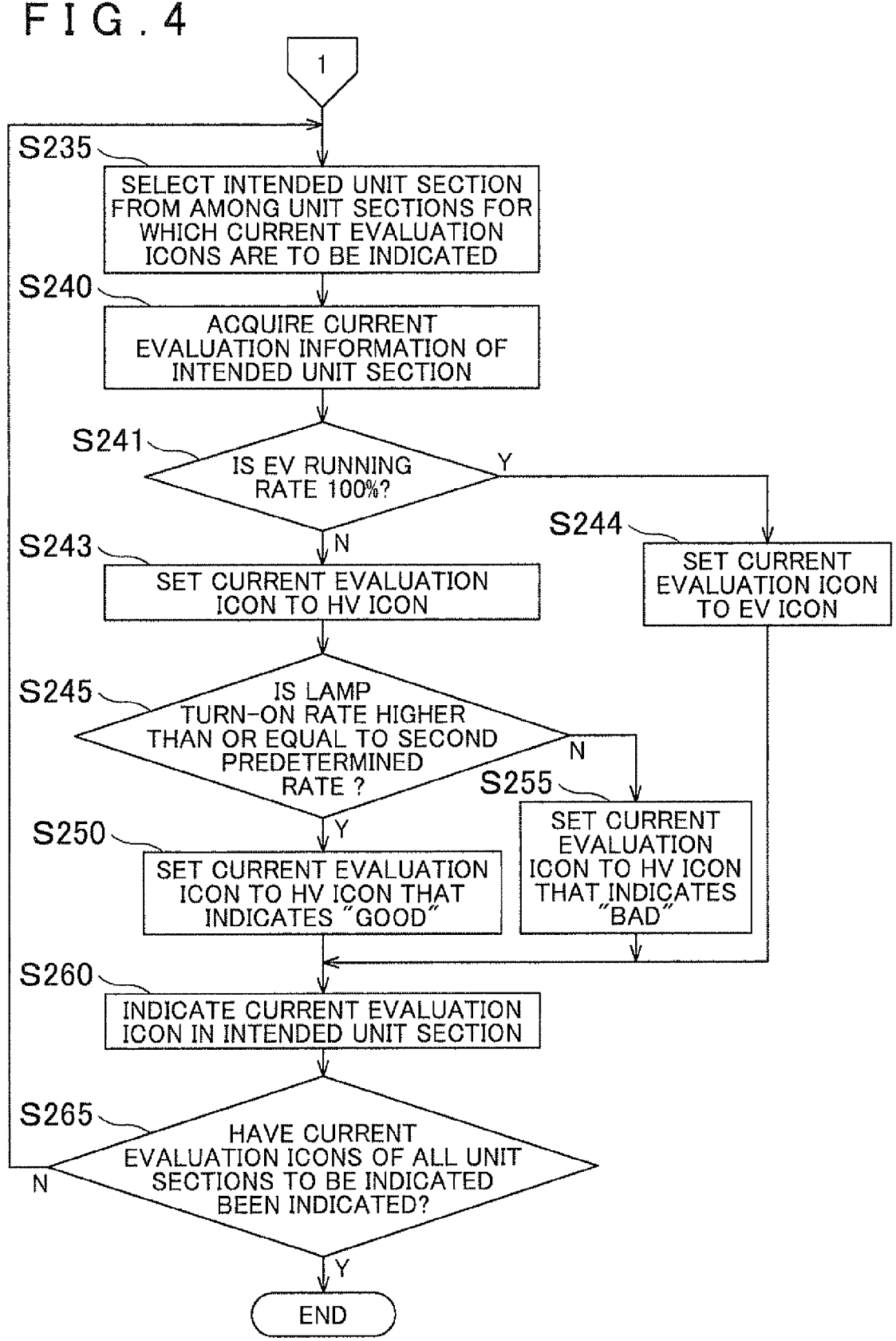
FIG. 4 is a flow chart that shows the evaluation information indication process.

Next, the evaluation information indication process will be described in detail. FIG. 3 and FIG. 4 are flow charts of the evaluation information indication process. In the present embodiment, the evaluation information indication process is executed when a destination is set by the driver and there is the evaluation information 30b for previous travel of which the departure point and destination are the same as the departure point and destination of current travel. In addition, the control unit 20 updates map display on the display unit of the user I/F unit 44 at predetermined intervals. Each time the map display is updated, the evaluation information indication process is executed. Furthermore, before the evaluation information indication process is executed, the above described diagnostic difficulty level is determined by a driver's command or a default value in advance.

Steps S200 to S230 shown in FIG. 3 form a loop process for indicating previous evaluations on the map. The control unit 20 initially selects an intended unit section from among unit sections of which previous evaluation icons are to be indicated through the processes executed by the map display control unit 21a and the previous evaluation acquisition unit 21c (step S200). That is, the control unit 20 determines the range of the map displayed on the display unit of the user I/F unit 44 through the process executed by the map display control unit 21a. Furthermore, the control unit 20 extracts the evaluation information 30b having the best average fuel consumption associated with the departure point and the destination from among the pieces of evaluation information 30b associated with the same departure point and destination as the departure point and destination of the current travel, through the process executed by the previous evaluation acquisition unit 21c. Furthermore, the control unit 20 determines unit sections included in the range of the map displayed on the display unit of the user I/F unit 44, from among the unit sections associated with the extracted pieces of evaluation information 30b, as the unit sections to be indicated through the process executed by the map display control unit 21a. Then, from among the unit sections to be indicated, any one of the unit sections for which the process of indicating a previous evaluation icon is not executed is selected as an intended unit section.

Subsequently, the control unit 20 acquires the previous evaluation information 30b of the intended unit section through the process executed by the previous evaluation acquisition unit 21c (step S205). That is, the EV running rate and the turn-on rate of the lamp 40a in the intended unit section in the previous travel are acquired. Subsequently, the control unit 20 determines whether the EV running rate in the intended unit section in the previous travel is 100% through the process executed by the previous evaluation acquisition unit 21c (step S207). Then, when it is not determined in step S207 that the EV running rate is 100%, the previous evaluation icon is set to the HV icon (step S208). On the other hand, when it is determined in step S207 that the EV running rate is 100%, the previous evaluation icon is set to the EV icon (step S209).

In the present embodiment, there is only a single type of previous evaluation icon as the EV icon, so, when step S209 is executed, the previous evaluation icon is fixed. For example, in the example shown in FIG. 5A, the previous evaluation icon for the intended unit section is set as the icon Epe. On the other hand, in the present embodiment, there are two types of previous evaluation icons as the HV icon, so, when step S208 is executed, the previous evaluation icon is set to any one of the icons Epg and Epb.

Then, the control unit 20 determines whether the turn-on rate of the lamp 40a in the intended unit section in the previous travel is higher than or equal to the second predetermined rate through the process executed by the previous evaluation acquisition unit 21c (step S210). When it is determined in step S210 that the turn-on rate of the lamp 40a is higher than or equal to the second predetermined rate, the control unit 20 sets the previous evaluation icon of the intended unit section to the HV icon that indicates "good" through the process executed by the previous evaluation acquisition unit 21c (step S215). For example, in the example shown in FIG. 5A, the previous evaluation icon is set to the icon Epg. On the other hand, when it is not determined in step S210 that the turn-on rate of the lamp 40a is higher than or equal to the second predetermined rate, the control unit 20 sets the previous evaluation icon of the intended unit section to the HV icon that indicates "bad" through the process executed by the previous evaluation acquisition unit 21c (step S220). For example, in the example shown in FIG. 5A, the previous evaluation icon is set to the icon Epb. The second predetermined rate to be compared with the turn-on rate of the lamp 40a is set on the basis of the above described diagnostic difficulty level, and is set so as to be larger as the diagnostic difficulty level increases. Thus, as the diagnostic difficulty level increases, the previous evaluation is hard to be set as "good".

Next, the control unit 20 indicates the previous evaluation icon of the intended unit section through the process executed by the map display control unit 21a (step S225). That is, the control unit 20 outputs a signal to the display unit of the user I/F unit 44 for drawing the previous evaluation icon set in any one of steps S209, S215 and S220 in the intended unit section. As a result, the display unit of the user I/F unit 44 indicates the previous evaluation icon in the intended unit section.

Subsequently, the control unit 20 determines whether the previous evaluation icons of all the unit sections to be indicated have been indicated through the process executed by the map display control unit 21a (step S230). That is, the control unit 20 determines whether the previous evaluation icons have been indicated for all the unit sections to be indicated, determined in step S200. In step S230, when it is not determined that the previous evaluation icons of all the unit sections to be indicated have been indicated, the processes of step S200 and the following steps are repeated. On the other hand, when it is determined in step S230 that the previous evaluation icons of all the unit sections to be indicated have been indicated, the process for indicating current evaluation icons is executed in step S235 and the following steps. At the time when the previous evaluation icons of all the unit sections to be indicated have been indicated, the solid-line icons Ete, Etg and Etb (current evaluation icons) shown in FIG. 5A have not been indicated, and only the broken-line icons Epe, Epg and Epb (previous evaluation icons) have been indicated. When the route is the same between the current travel and the previous travel, previous evaluation icons are indicated in unit sections behind the current position of the hybrid vehicle; however, when current evaluation icons are indicated in the unit sections in which the previous evaluation icons have been indicated, the current evaluation icons are preferentially indicated through the processes in step S235 and the following steps.

Steps S235 to S265 shown in FIG. 4 form a loop process for indicating current evaluation icons on the map. The control unit 20 initially selects an intended unit section from among unit sections of which current evaluation icons are to be indicated through the processes executed by the map display control unit 21a and the current evaluation acquisition unit 21b (step S235). That is, the control unit 20 determines the range of the map displayed on the display unit of the user I/F unit 44 through the process executed by the map display control unit 21a. Furthermore, the control unit 20 determines the unit sections included in the range of the map displayed on the display unit of the user I/F unit 44, from among the unit sections associated with the pieces of evaluation information 30b stored in the storage medium 30 during the current travel, as the unit sections to be indicated through the process executed by the current evaluation acquisition unit 21b. Then, from among the unit sections to be indicated, any one of the unit sections that have not been subjected to the process of indicating current evaluation icons is selected as an intended unit section.

Subsequently, the control unit 20 acquires current evaluation information of the intended unit section through the process executed by the current evaluation acquisition unit 21b (step S240). That is, the EV running rate and the turn-on rate of the lamp 40a in the intended unit section in the current travel are acquired. Subsequently, the control unit 20 determines whether the EV running rate in the intended unit section in the current travel is 100% through the process executed by the current evaluation acquisition unit 21b (step S241). Then, when it is not determined in step S241 that the EV running rate is 100%, the current evaluation icon is set to the HV icon (step S243). On the other hand, when it is determined in step S241 that the EV running rate is 100%, the current evaluation icon is set to the EV icon (step S244). As in the case of the previous evaluation icon, when step S244 is executed, the current evaluation icon is fixed. For example, in the example shown in FIG. 5A, the current evaluation icon for the intended unit section is set to the icon Ete. On the other hand, in the present embodiment, when step S243 is executed, the current evaluation icon is set to any one of the icons Etg and Etb.

The control unit 20 determines whether the turn-on rate of the lamp 40a in the intended unit section in the current travel is higher than or equal to the second predetermined rate through the process executed by the current evaluation acquisition unit 21b (step S245). When it is determined in step S245 that the turn-on rate of the lamp 40a is higher than or equal to the second predetermined rate, the control unit 20 sets the current evaluation icon of the intended unit section to the HV icon that indicates "good" through the process executed by the current evaluation acquisition unit 21b (step S250). For example, in the example shown in FIG. 5A, the current evaluation icon is set to the icon Etg. On the other hand, when it is not determined in step S245 that the turn-on rate of the lamp 40a is higher than or equal to the second predetermined rate, the control unit 20 sets the current evaluation icon of the intended section to the HV icon that indicates "bad" through the process executed by the current evaluation acquisition unit 21b (step S255). For example, in the example shown in FIG. 5A, the current evaluation icon is set to the icon Etb. The second predetermined rate to be compared with the turn-on rate of the lamp 40a is equal to the second predetermined rate in step S210.

Subsequently, the control unit 20 indicates the current evaluation icon in the intended unit section through the process executed by the map display control unit 21a (step S260). That is, the control unit 20 outputs a signal to the display unit of the user I/F unit 44 for drawing the current evaluation icon set in any one of steps S244, S250 and S255 in the intended unit section. As a result, the display unit of the user I/F unit 44 indicates the current evaluation icon in the intended unit section.

Subsequently, the control unit 20 determines whether the current evaluation icons of all the unit sections to be indicated have been indicated through the process executed by the map display control unit 21a (step S265). That is, the control unit 20 determines whether the current evaluation icons of all the unit sections to be indicated, determined in step S235, have been indicated. When it is not determined in step S265 that the current evaluation icons of all the unit sections to be indicated have been indicated, the processes of step S235 and the following steps are repeated. On the other hand, when it is determined in step S265 that the current evaluation icons of all the unit sections to be indicated have been indicated, the control unit 20 ends the evaluation information indication process. In the present embodiment, when a current evaluation icon is indicated in the unit section in which the previous evaluation icon has been indicated, the current evaluation icon is preferentially indicated. Therefore, when the current evaluation icons of the unit sections to be indicated have been indicated, the current evaluation icons Ete, Etg and Etb are indicated by the solid line in sections in which the hybrid vehicle has travelled before the current position of the hybrid vehicle, as in the case of the example shown in FIG. 5A. In addition, in the processes of steps S235 to S265, no current evaluation icons are indicated in sections ahead of the current position of the hybrid vehicle. Therefore, the previous evaluation icons Epe, Epg and Epb are indicated by the broken line in the sections ahead of the current position of the hybrid vehicle.

(4) Alternative Embodiments

The above described embodiment is just an example for carrying out the aspect of the invention, and, as long as EV icons that indicate that the hybrid vehicle travels in the EV mode and HV icons that indicate evaluations of fuel consumption in the HV mode are indicated at the time when current evaluation icons and previous evaluation icons that indicate evaluations by unit sections are indicated, various other embodiments may be employed. For example, the current evaluations and the previous evaluations may be acquired from a device not equipped for the hybrid vehicle, such as an information management center. The navigation terminal 10 may be fixedly mounted on the hybrid vehicle or the portable navigation terminal 10 may be carried into the hybrid vehicle and utilized.

A fuel consumption may be evaluated on the basis of a condition of a combination of a plurality of elements or may be evaluated on the basis of a condition of one element (for example, a value of fuel consumption). Furthermore, the evaluation information of the fuel consumption may be any information as long as it becomes a guideline for varying the fuel consumption. The evaluation information may be information that indicates the value of fuel consumption (for example, information that indicates the average fuel consumption in a unit section) or may be information that indicates the result of comparison between a reference fuel consumption and a current fuel consumption (for example, information that indicates a relative relationship with a reference fuel consumption). In addition, the evaluation information of the fuel consumption may be any information as long as it becomes a guideline for varying the driving efficiency of the vehicle through improvement in driver's driving technique, and may be information that evaluates whether there is driving operation for improving the fuel consumption (for example, information that indicates the frequency of driving operation that contributes to improvement in fuel consumption). In addition, the fuel consumption may be a consumption efficiency (a consumption amount or refueling price per unit distance) of liquid fuel for causing the vehicle to travel a unit distance, and the internal combustion engine is not necessarily driven. That is, when the hybrid vehicle travels in the EV mode in which the internal combustion engine is not driven, the hybrid vehicle is able to travel the unit distance by utilizing electric power, and no liquid fuel for driving the internal combustion engine is consumed, so the fuel consumption improves in this respect. Thus, a current evaluation or a previous evaluation may include not only an evaluation of consumption amount of liquid fuel but also an evaluation of consumption amount of electric power, and may also be an evaluation of whether there is driving operation for improving the driving efficiency by suppressing consumption of any one or both of liquid fuel and electric power.

A departure point and a destination are not only determined at the time when the driver explicitly specifies a destination, as in the case of the above described configuration, but also may be determined by various methods. For example, a point at which it is determined that, on the basis of the operating state of the hybrid vehicle, the hybrid vehicle has started off and a point at which it is determined that, on the basis of the operating state of the hybrid vehicle, the hybrid vehicle has arrived may be respectively set as a departure point and a destination. A current destination may be, for example, estimated on the basis of a current travel route, a previous travel history, and the like.

In the above described embodiment, when the hybrid vehicle has travelled in the past from the same departure point as the departure point of current travel to the same destination as the destination of the current travel, the travel section is set as a section for which previous evaluation icons are indicated; instead, a section for which previous evaluation icons are indicated may be determined on according to another rule. That is, within a previous travel section displayed on the map, a section to be contrasted with current evaluations may be set as a section for which previous evaluation icons are indicated, and evaluations of fuel consumption of the respective unit sections in the section to be indicated may be set as the previous evaluations. Sections for which previous evaluation icons are indicated may be all or part of the sections having information about a previous evaluation. For example, previous evaluation icons may be indicated in all or part of unit sections, which have information by which a previous evaluation may be determined, around a current position. In this case, a previous evaluation of fuel consumption is regularly determined and is stored in the storage medium. Then, previous evaluation icons of all the unit sections, of which previous evaluations of fuel consumption are stored in the storage medium, may be indicated. Here, the all unit sections are sections on roads included in the map. Alternatively, previous evaluation icons in a section to be indicated, selected from among unit sections of which previous evaluations of fuel consumption are stored in the storage medium, may be indicated. In this case, when the total fuel consumption amount in current travel up to the current position is large and the driver intends to suppress a fuel consumption amount in the following travel, the driver selects a route such that the hybrid vehicle travels a section in which the total fuel consumption amount tends to be suppressed in previous travel to thereby make it possible to estimate that consumption of fuel may be suppressed.

When a section to be indicated is selected from among unit sections of which previous evaluations of fuel consumption are stored in the storage medium, previous evaluations that indicate evaluations of fuel consumption of the hybrid vehicle for the respective unit sections in the case where the hybrid vehicle has travelled a section including the current position in the past prior to current travel may be acquired. That is, a section that includes the current position is set as a section for which the previous evaluation icons are indicated and then previous evaluations are acquired. With this configuration, in a state where current evaluation icons behind the current position are indicated on the map, previous evaluation icons of a section including the current position are indicated together on the map. Because the section that includes the current position includes a road on which the hybrid vehicle travels after the current position, the driver is able to recognize previous evaluations after the current position and, further, drive while contrasting them with current evaluations before the current position.

Other than travel from a departure point to a destination is set as current travel, current travel may be defined in various modes. The starting point of a current travel section is not specifically limited; when the hybrid vehicle has travelled continuously to the current position, the starting point of the continuous travel may be set as the starting point of the current travel section, and, when the hybrid vehicle has travelled discontinuously such as when the hybrid vehicle travels at different travel dates, or the like, a point at which the hybrid vehicle is present before the current position may be set as the starting point of a section. That is, a current travel section may be defined so that current travel and previous travel is distinguished from and contrasted with each other.

More specifically, for example, when a power source (the internal combustion engine 46 or the motor 47) of the hybrid vehicle is started and then the hybrid vehicle has reached the current position without stopping the power source, current evaluations in a section from the position at which the power source has been started to the current position may be acquired, and previous evaluations before the time when the power source of the hybrid vehicle has been started may be acquired. That is, continuous travel from a position at which the latest start-up of the power source (start-up of the power source at previous time closest to current time) had been performed to the current position may be set as current travel to acquire current evaluations, and evaluations of previous travel before the current travel may be set as previous evaluations. In this case, for example, current evaluations may be determined on the basis of the evaluation information 30b acquired after the time at which the latest start-up of the power source of the hybrid vehicle has been performed, and previous evaluations may be determined on the basis of the evaluation information 30b acquired before that time. With this configuration, each time the driver starts driving, it is possible to determine whether the fuel consumption is improved with respect to travel before the driver starts driving.

Furthermore, when the hybrid vehicle has reached the current position by travel after the time specified by a user, current evaluations in a section from the position of the hybrid vehicle at the time specified by the user to the current position may be acquired, and previous evaluations before the time specified by the user may be acquired. That is, evaluations after the time specified by the user and evaluations before the specified time are contrasted with each other. In this case, current evaluations may be determined on the basis of the evaluation information 30b acquired after the time specified by the user, and previous evaluations may be determined on the basis of the evaluation information 30b acquired before the specified time. With this configuration, it is possible to determine whether the fuel consumption is improved as compared with travel at the time specified by the user.

A unit section may be a section for leading to the conclusion of an evaluation regarding the fuel consumption. Other than as section having a set distance, a section determined in accordance with a predetermined rule may be set as a unit section, for example. For example, one link that has the closest nodes indicated by map information as end points may be used as one unit section. A unit section of which a current evaluation icon is to be indicated and a unit section of which a previous evaluation icon is to be indicated may coincide with each other or may be different from each other. That is, unit sections just need to be determined in accordance with a common rule, and unit sections to be displayed may be selected where appropriate.

Figure 6C:
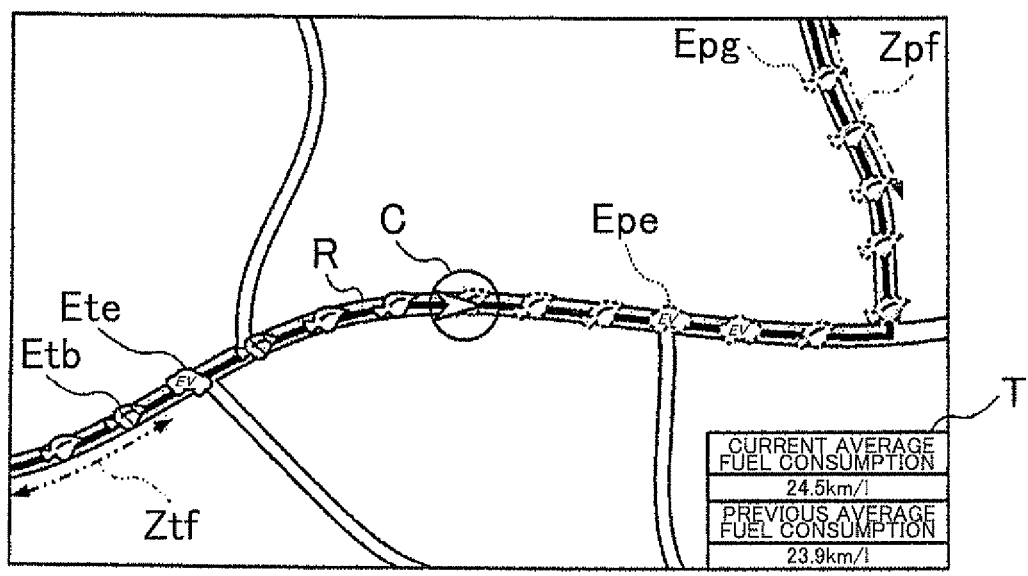

In the hybrid vehicle, when the hybrid vehicle travels in the HV mode in a state where the battery 48 is charged to an upper limit (that is, the battery 48 is fully charged), regenerative energy cannot be recovered, so the driving efficiency is poor. Then, while the hybrid vehicle is travelling, the control unit 20 may acquire the SOC of the battery 48 on the basis of the output signal of the drive control ECU 49 and store the SOC in the storage medium 30. Then, the control unit 20 may determine the SOC in the current travel and the SOC in the previous travel on the basis of the SOC stored in the storage medium 30 and indicate positions at which the battery 48 is charged to an upper limit in the current travel and in the previous travel on the map. For example, as in the case of the sections Ztf and Zpf indicated by the alternate long and short dashes line in FIG. 6C, the positions at which the battery 48 is charged to an upper limit may be indicated. With this configuration, the driver is able to obtain a guideline that the hybrid vehicle should travel in the EV mode in the current travel before the hybrid vehicle reaches the section Zpf in which the battery 48 has been charged to an upper limit in the previous travel. In addition, when the section Ztf in which the battery 48 has been charged to an upper limit in the current travel is indicated, the driver is able to obtain a guideline that the hybrid vehicle should travel in the EV mode after the section Ztf in the current travel.

As in the case of the evaluation indication system according to the above described embodiment, in the configuration that current evaluation icons and previous evaluation icons that indicate evaluations of respective unit sections are indicated, a manner of indicating EV icons that the hybrid vehicle travels in the EV mode and HV icons that indicate evaluations of fuel consumption in the HV mode is applicable as a program or a method. In addition, the above described system, program and method may be implemented as a sole device, may be implemented as a plurality of devices or may be implemented by utilizing a component shared with various portions provided for a hybrid vehicle, and are implemented in various forms. For example, it is possible to provide a navigation system, a navigation method and a program that are provided with the device as described above. In addition, an aspect of the invention may be modified where appropriate, for example, part of the aspect of the invention is implemented by software and part of the aspect of the invention is implemented by hardware. Furthermore, the aspect of the invention may include a storage medium that stores a program for controlling the system. The storage medium may be a magnetic storage medium, may be a magnetooptical storage medium or may be any storage media that will be developed in the future.

What is claimed is:

1. An evaluation indication system for a hybrid vehicle that includes an internal combustion engine and a motor and that is configured to travel in an HV mode in which the internal combustion engine is allowed to be driven or in an EV mode in which the internal combustion engine is stopped, the evaluation indication system comprising:

a memory storing an evaluation indication program; and
a processor that, when executing the stored program:
displays a current position of the hybrid vehicle and a map around the current position on a display;
acquires current evaluations that indicate evaluations of fuel consumption of the hybrid vehicle in a current travel along a route, the route being divided into unit sections an each acquired current evaluation being an evaluation for a unit section of the route;
acquires previous evaluations that indicate evaluations of fuel consumption of the hybrid vehicle in a past travel of the vehicle along the route that occurred prior to the current travel, each acquired previous evaluation being an evaluation for a unit section of the route;

indicates current evaluation icons that indicate the current evaluations of the respective unit sections behind the current position of the vehicle with respect to a travel direction along the route on the map; and indicates previous evaluation icons that indicate the previous evaluations of the respective unit sections ahead of the current position of the vehicle with respect to the travel direction along the route of the vehicle on the map, each of the current evaluation icons and the previous evaluation icons being set to any one of an EV icon and an HV icon, the EV icon indicating that the hybrid vehicle has travelled a corresponding unit section in the EV mode, and the HV icon indicating an evaluation of fuel consumption when the hybrid vehicle has travelled a corresponding unit section in the HV mode.

2. The evaluation indication system according to claim 1, wherein the processor, when executing the stored program:

acquires a state of charge of a battery equipped for the hybrid vehicle with respect to the current travel and the previous travel; and indicates:
position at which the battery has been fully charged in the current travel on the map; and
a position at which the battery has been fully charged in the previous travel on the map.

3. The evaluation indication system according to claim 1, wherein the processor, when executing the stored program displays the current evaluation icons and the previous evaluation icons on the map in different modes.

4. The evaluation indication system according to claim 1, wherein the processor, when executing the stored program displays the EV icon and the HV icon on the map in different modes.

5. An evaluation indication method for a hybrid vehicle that includes an internal combustion engine and a motor and that is configured to travel in an HV mode in which the internal combustion engine is allowed to be driven or in an EV mode in which the internal combustion engine is stopped, the evaluation indication method comprising:

displaying, with a processor, a current position of the hybrid vehicle and a map around the current position on a display;

acquiring, with the processor, current evaluations that indicate evaluations of fuel consumption of the hybrid vehicle in a current travel along a route, the route being divided into unit sections an each acquired current evaluation being an evaluation for a unit section of the route;

acquiring, with the processor, previous evaluations that indicate evaluations of fuel consumption of the hybrid vehicle in a past travel of the vehicle along the route that occurred prior to the current travel, each acquired previous evaluation being an evaluation for a unit section of the route;

indicating, with the processor, current evaluation icons that indicate the current evaluations of the respective unit sections behind the current position of the vehicle with respect to a travel direction along the route on the map; and indicating, with the processor, previous evaluation icons that indicate the previous evaluations of the respective unit sections ahead of the current position of the vehicle with respect to the travel direction along the route of the vehicle on the map, each of the current evaluation icons and the previous evaluation icons being set to any one of an EV icon that indicates that the hybrid vehicle has travelled a corresponding unit section in the EV mode and an HV icon that indicates an evaluation of fuel consumption when the hybrid vehicle has travelled a corresponding unit section in the HV mode.

6. A non-transitory computer-readable storage medium that stores computer-executable instructions for performing an evaluation indication function for a hybrid vehicle that includes an internal combustion engine and a motor and that is configured to travel in an HV mode in which the internal combustion engine is allowed to be driven or in an EV mode in which the internal combustion engine is stopped, the evaluation indication function comprising:

displaying a current position of the hybrid vehicle and a map around the current position on a display;

acquiring current evaluations that indicate evaluations of fuel consumption of the hybrid vehicle in a current travel along a route, the route being divided into unit sections an each acquired current evaluation being an evaluation for a unit section of the route;

acquiring previous evaluations that indicate evaluations of fuel consumption of the hybrid vehicle in a past travel of the vehicle along the route that occurred prior to the current travel, each acquired previous evaluation being an evaluation for a unit section of the route;

indicating current evaluation icons that indicate the current evaluations of the respective unit sections behind the current position of the vehicle with respect to a travel direction along the route on the map; and indicating previous evaluation icons that indicate the previous evaluations of the respective unit sections ahead of the current position of the vehicle with respect to the travel direction along the route of the vehicle on the map, each of the current evaluation icons and the previous evaluation icons being set to any one of an EV icon that indicates that the hybrid vehicle has travelled a corresponding unit section in the EV mode and an HV icon that indicates an evaluation of fuel consumption when the hybrid vehicle has travelled a corresponding unit section in the HV mode.

\* \* \* \* \*